United States Patent [19]

Song et al.

[11] Patent Number: 5,469,518
[45] Date of Patent: Nov. 21, 1995

[54] BACK-BOARD OPTICAL SIGNAL INTERCONNECTION MODULE USING FOCUSING GRATING COUPLER ARRAYS

[75] Inventors: Seok-Ho Song; Sang-Don Jung, both of Daejeon, Rep. of Korea

[73] Assignee: Electronics and Telecommunications Research Institute, Daejeon, Rep. of Korea

[21] Appl. No.: 356,562

[22] Filed: Dec. 15, 1994

[30] Foreign Application Priority Data

Nov. 15, 1994 [KR] Rep. of Korea ............... 94-29914

[51] Int. Cl.$^6$ ............................................ G02B 6/30
[52] U.S. Cl. ............................................ 385/89; 385/37
[58] Field of Search ................................ 385/10, 37, 42, 385/51, 89, 93

[56] References Cited

U.S. PATENT DOCUMENTS 5,179,605  1/1993  Kaverhad et al. ................ 385/37

OTHER PUBLICATIONS

Applied Optics, vol. 23, No. 11, Jun. 1984, pp. 1749–1753, entitled "Waveguide grating lenses for optical couplers", by Gen–ichi Hatakoshi, Harumi Fujima and Kenya Goto.
Applied Optics, vol. 30, No. 9, Mar. 1991, pp. 1090–1095, entitled "Integrated optic array illuminator: a design for efficient and uniform power distribution" by Mitsuo Takeda and Toshihiro Kubota.
Optics Letters, vol. 14, No. 12, Jun. 15, 1989, pp. 651–652, entitled "Array illuminator using grating couplers", by Toshihiro Kubota and Mitsuo Takeda.
SPIE vol. 1461, Practical Holography V (1991), pp. 303–312, entitled "Waveguide Holography and Its Applications" by Qiang Huang and H. John Caulfield, Center for Applied Optics, The University of Alabama in Huntsville, Huntsville, Ala.
IEEE (Jan. 1986), entitled "An Integrated–Optic Disk Pickup Device" by Shogo Ura, Toshiaki Suhara, Hiroshi Nishihara and Jiro Koyama.

*Primary Examiner*—Rodney B. Bovernick
*Assistant Examiner*—Robert E. Wise
*Attorney, Agent, or Firm*—Antonelli, Terry, Stout & Kraus

[57] ABSTRACT

The present invention discloses an optical back-board interconnection module scheme applying optical technique in a back-board interconnection module scheme for distribution of communication signals among opto-electronic integrated circuit (OEIC) boards of data communication network or computer systems with ultra-high speed.

The present invention provides a back-board interconnection scheme having out-coupling uniformity level of optical power of below 1% and total out-coupling efficiency of more than 99%, and a method for designing a focusing grating coupler (FGC) array used as an important component in the back-board interconnection scheme and FGC standard specification obtained by such a method. When the inventive module is applied to the back-board interconnection scheme to couple communication signals with ultra-high speed performance among a plurality of opto-electronic integrated circuit boards in the high speed data communication network or high speed computer systems, optical signals transmitted through data bus lines at an ultra-high speed of more than several gigabits per sec. may be distributed to a plurality of OEIC boards. Moreover, the number of data transmission lines that may be integrated per unit area may be increased.

4 Claims, 4 Drawing Sheets n {THE ORDER OF DISTRIBUTED LIGHT}
THICKNESS = 0.55[μm], MAXIMUM
DISTRIBUTION EFFICIENCY = 0.91932

BACK-BOARD OPTICAL SIGNAL INTERCONNECTION MODULE USING FOCUSING GRATING COUPLER ARRAYS

BACKGROUND OF THE INVENTION

The present invention relates to an optical back-board interconnection module applying optical technique in a back-board interconnection module scheme for distribution of communication signals among opto-electronic integrated circuit (OEIC) boards of data communication network or computer systems with ultra-high speed.

When the inventive module is applied to the back-board interconnection scheme to couple communication signals with ultra-high speed performance among a plurality of opto-electronic integrated circuit boards in the high speed data communication network or high speed computer systems, optical signals transmitted through data bus lines at an ultra-high speed of more than several gigabits per sec. may be distributed to a plurality of OEIC boards.

As an example, if the optical transmission-reception technique of 2.5 gigabits per sec. that has been developed in Korea, is applied to the back-board interconnection of the present invention, the speed of data communication among a plurality of interface boards that are connected to the inside of the computer may be raised to a speed of gigabits per sec. from the present speed of megabits per sec.

Moreover, the optical data transmission system has slight noise generating effect among adjacent transmission signals compared to electrical data transmission system, and the number of data transmission lines that may be integrated per unit area may be increased.

When it comes to forming optically the back-board interconnection scheme for coupling of the high speed signals among a plurality of OEIC boards, uniformity level and total out-coupling efficiency (i.e. sum of each of the distributed optical power) of the optical power distributed to each board are one of the most important parameters.

SUMMARY OF THE INVENTION

Accordingly, the present invention provides a back-board interconnection scheme having out-coupling uniformity level of optical power of below 1% and total out-coupling efficiency of more than 99%, and a method for designing a focusing grating coupler (FGC) array used as an important component in the back-board interconnection scheme and FGC standard specification obtained by the method.

The inventive back-board optical signal interconnection device comprises:

- a glass substrate, a body of a back-board interconnection module;
- input fiber arrays for connecting input signals to the glass substrate of the back-board interconnection module; photodiodes connected between the glass substrate and boards to detect optical signals distributed from the back-board interconnection module in each board and outputting electrical signals to opto electronic integrated circuit boards;
- focusing grating coupler arrays; and
- waveguides having the glass substrate on its upper surface and focusing grating couplers on its bottom to transmitting signals input through input fiber arrays to the glass substrate and distribute signals in focusing grating coupler arrays. The focusing grating coupler arrays disposed on the bottom of the waveguides to distribute optical signals transmitted through the waveguides to each board.

DETAILED DESCRIPTION OF THE PRESENT INVENTION

Figure 1:
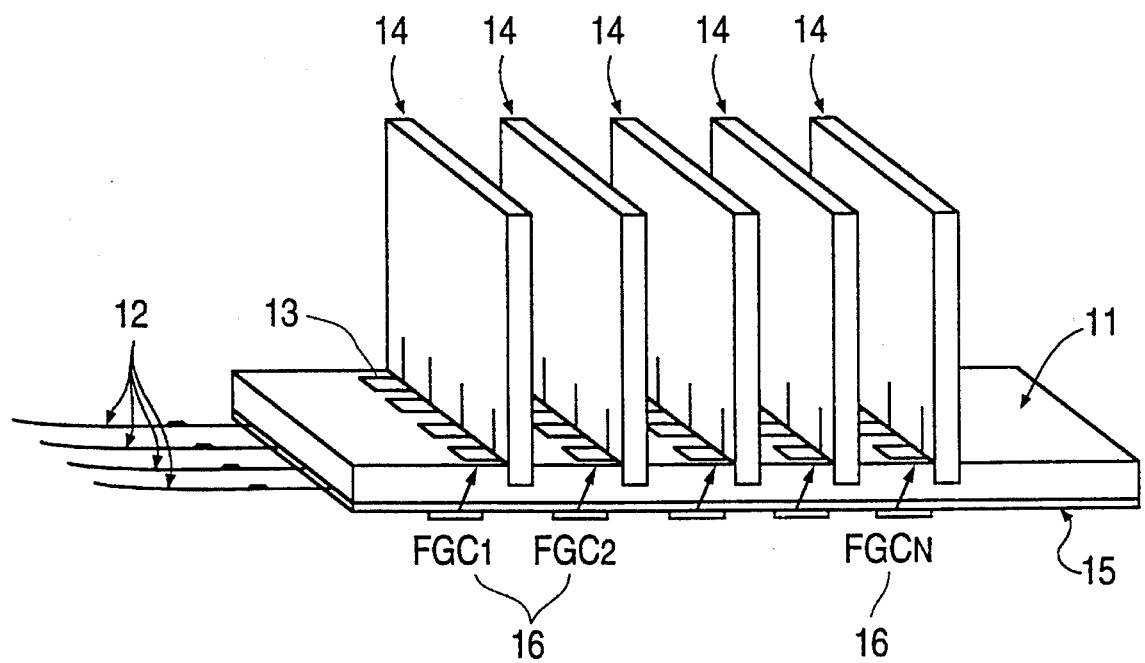
FIG. 1 depicts a three-dimensional structure of a back-board interconnection using the inventive focusing grating coupler (FGC) arrays.

FIG. 1 shows a three-dimensional structure of a back-board interconnection using the inventive focusing grating coupler (FGC) arrays.

The module of the present invention includes a glass substrate, a body of a back-board interconnection module, input fiber arrays for connecting input signals to the glass substrate of the back-board interconnection module, photodiodes for detecting optical signals distributed from the back-board interconnection module in each board, opto-electronic integrated circuit (OEIC) boards having opto-electronic integrated circuits, focusing grating coupler (FGC) arrays FGC1, FGC2 and FGCN, and waveguides transmitting signals input through the input fiber arrays to the glass substrate and distributing the signals in the FGC arrays.

Figure 2:
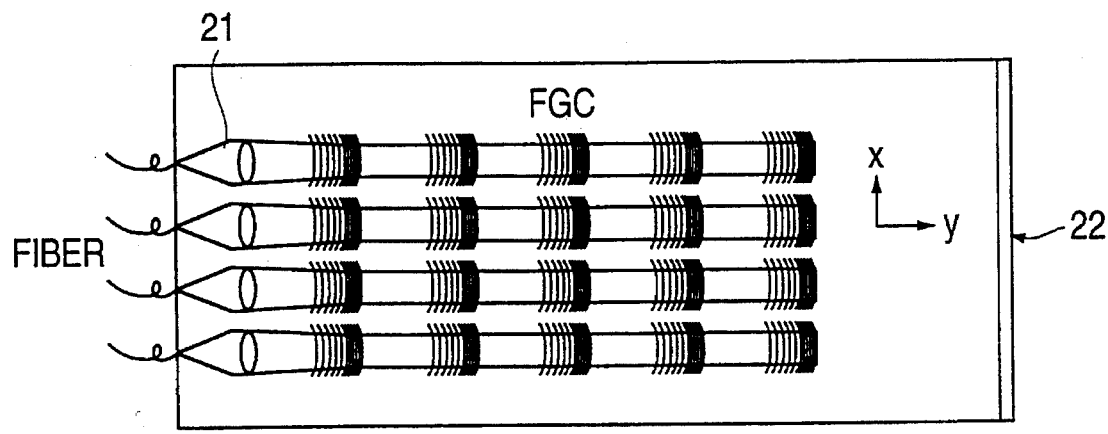
FIG. 2 is a bottom view of the back-board interconnection module of FIG. 1.

FIG. 2 is a bottom view of the back-board interconnection module showing wave-guide lenses that horizontally move the light that is incident from optical fibers on the waveguides and an absorption layer to absorb and remove the remaining light in the waveguides.

FIG. 2 shows the case that there are four input signal, four FGC arrays having five FGCs (N=5) respectively.

The input optical signals incident on the waveguides through the input optical fibers are formed of single-mode wave, and this wave becomes a parallel light by the wave-guide lenses and moves in the direction of y-axis to be distributed toward the glass substrate by the N FGCs.

Figure 3:
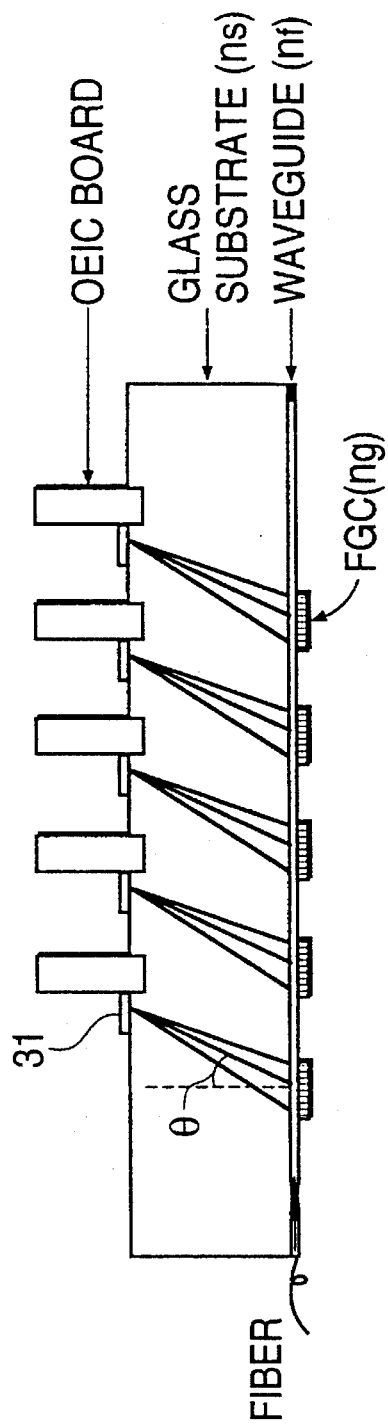
FIG. 3 is a side-sectional view of the back-board interconnection module of FIG. 1.

FIG. 3 is a side-sectional view of the back-board interconnection module of FIG. 1.

As shown in FIG. 2, the light is distributed toward the photodiodes at an angle of θ by the FGCs. In order that the distributed optical signals have uniform optical power, the out-coupling efficiency ($\eta 1, \eta 2, \eta 3, \eta N$ as shown in FIG. 4)

of each FGC has to meet the following expression:

$$\eta_n = \frac{\eta_1}{1-(n-1)\cdot\eta_1}, n = 1, 2, \ldots, N \quad (1)$$

Figure 4:
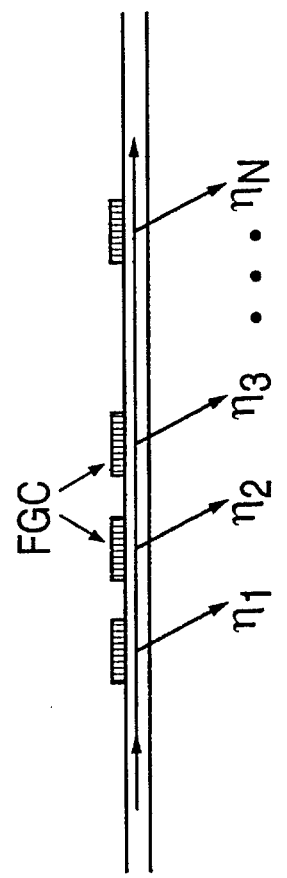
FIG. 4 depicts out-coupling efficiency $\eta_1, \eta_2, \eta_3, \ldots, \eta_N$ of one-dimensional focusing grating couplers (FGCs) to uniform the distributed optical power, when the light moving within the waveguides is distributed from N FGC arrayed in one dimensional way.
Figure 5:
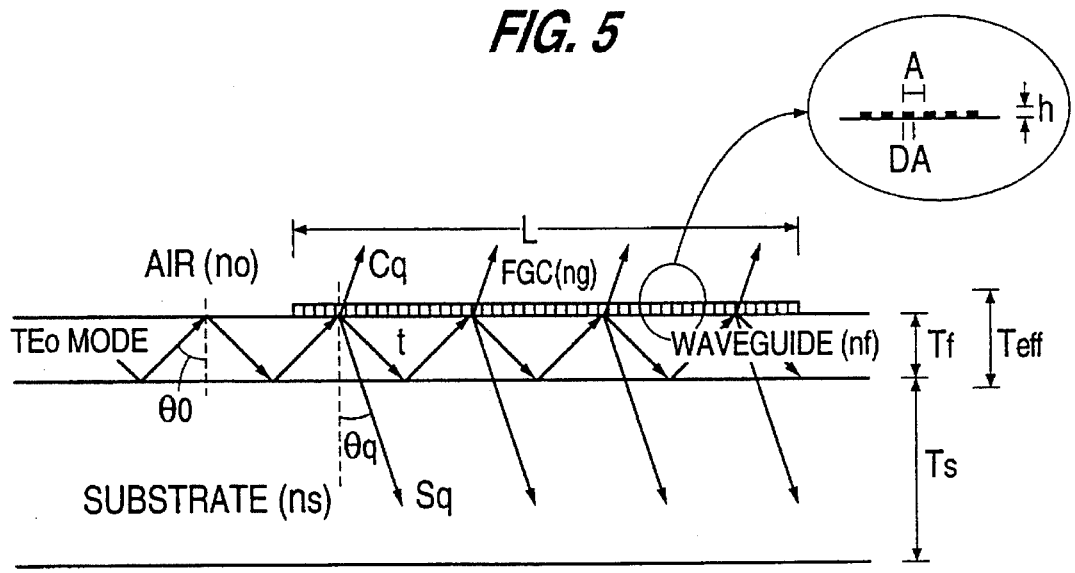
FIG. 5 shows the formation of a FGC among one-dimensional FGC arrays in FIG. 4

FIG. 5 shows the formation of a FGC among one-dimensional FGC arrays in FIG. 4 or FIG. 1.

The reference letters designate the followings: length L, signal optical wave that moves in the waveguides TEo-MODE, a single mode; a moving angle in the waveguides of the input signal optical waves $\theta_0$; the amount of the light distributed toward the glass substrate by contact of optical wave and FGC, Sq; a moving angle of the light distributed toward the glass substrate $\theta q$; amount of the light distributed to the air by contact of optical wave and FGC Cq; the amount of the light moving in tact in the waveguides without being distributed to the outside t; grating period of FGC A; ratio the length of the grating medium amounts to within one grating period of FGC D; and thickness of the grating medium h.

The single-mode wave that moves horizontally within the waveguides distributes the optical signal, contacting one FOC several times, and the number of contact M is given as follows:

$$M = \frac{L}{2T_{eff}\tan\theta_0} \quad (2)$$

Figure 6:
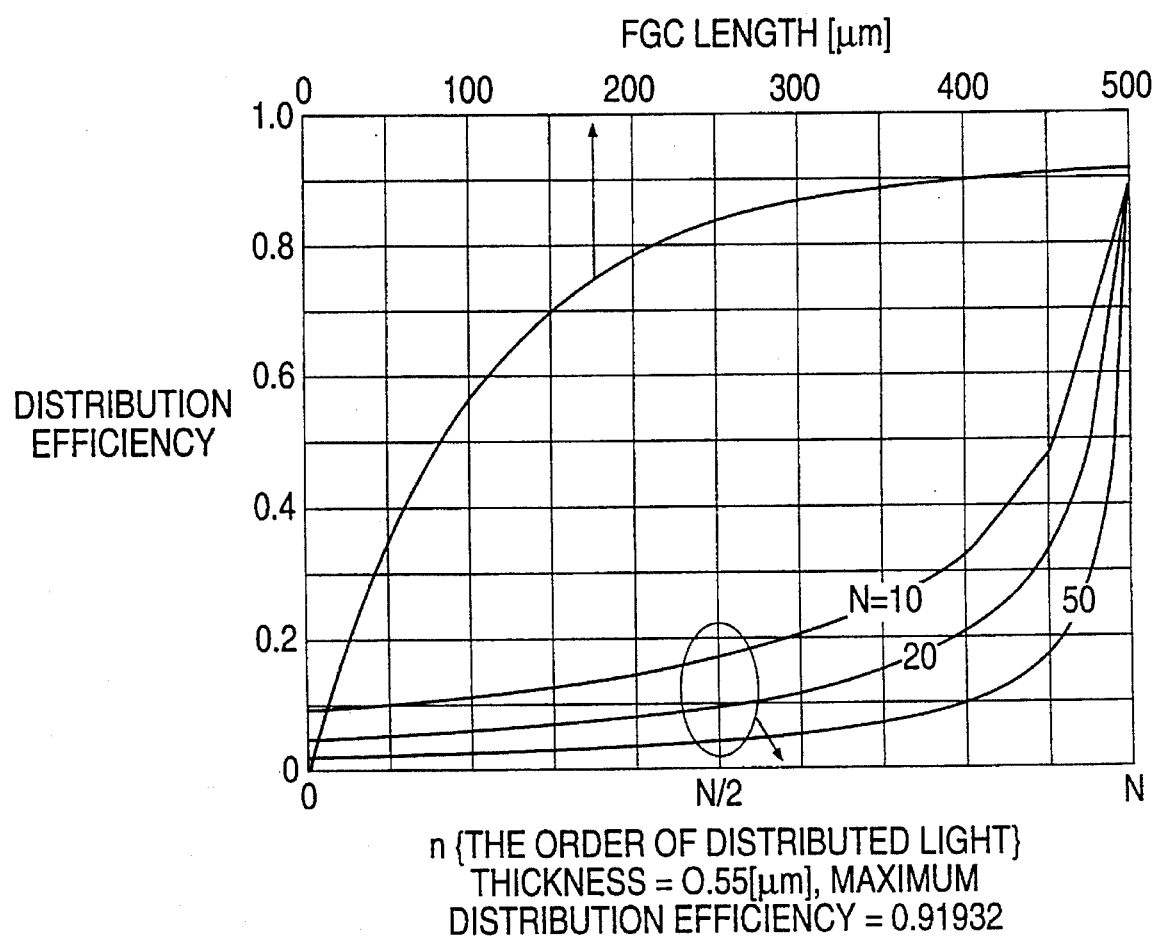
FIG. 6 is a graph indicating the OCE distribution chart of FGCs for uniformity of the distributed light and OCE variation amount by the FGC length L in case of N=10, 20 and 50 in one-dimensional FGC arrays of FIG. 1 or FIG. 4.

FIG. 6 is a graph indicating the OCE distribution chart of FGCs for uniformity of the distributed light and OCE variation amount by the FGC length L in case of N=10, 20 and 50 in one-dimensional FGC arrays of FIG. 1 or FIG. 4.

In the grate of the FGC D value is defined as 0.5 in FIG. 5 and h is defined as 50 nm. The longer the length of the FGC is, the more out-coupling efficiency is increased to 96%, and uniform distribution of optical signals may be performed only when the OCE of N/2 FGCs is smaller than 0.2 i.e. 20%.

However, since the length of the FGC is several μm at best, the distribution area of the optical signals distributed to the photodiodes gets greatly large.

For example, when the thickness of the glass substrate is 10 mm and the length of FGC is 20 μm, the diameter of the optical signals becomes about 1 mm, and the detection efficiency of the optical signals gets low. In addition, since the distance between input optical signals should be more than 1 mm, the number of the input optical signals that can be distributed is limited. The integrity of the input optical signals becomes 1 per unit area of 1 mm maximum.

Accordingly, in order to enhance the integrity of signal, it is necessary to decrease the distribution diameter of optical signals distributed to the photodiodes.

As a method for decreasing the distribution diameter in this invention, D value (ratio that the length of the grating medium amounts to within one grating period) is selected among values other than 0.5 in FIG. 6.

Figure 7:
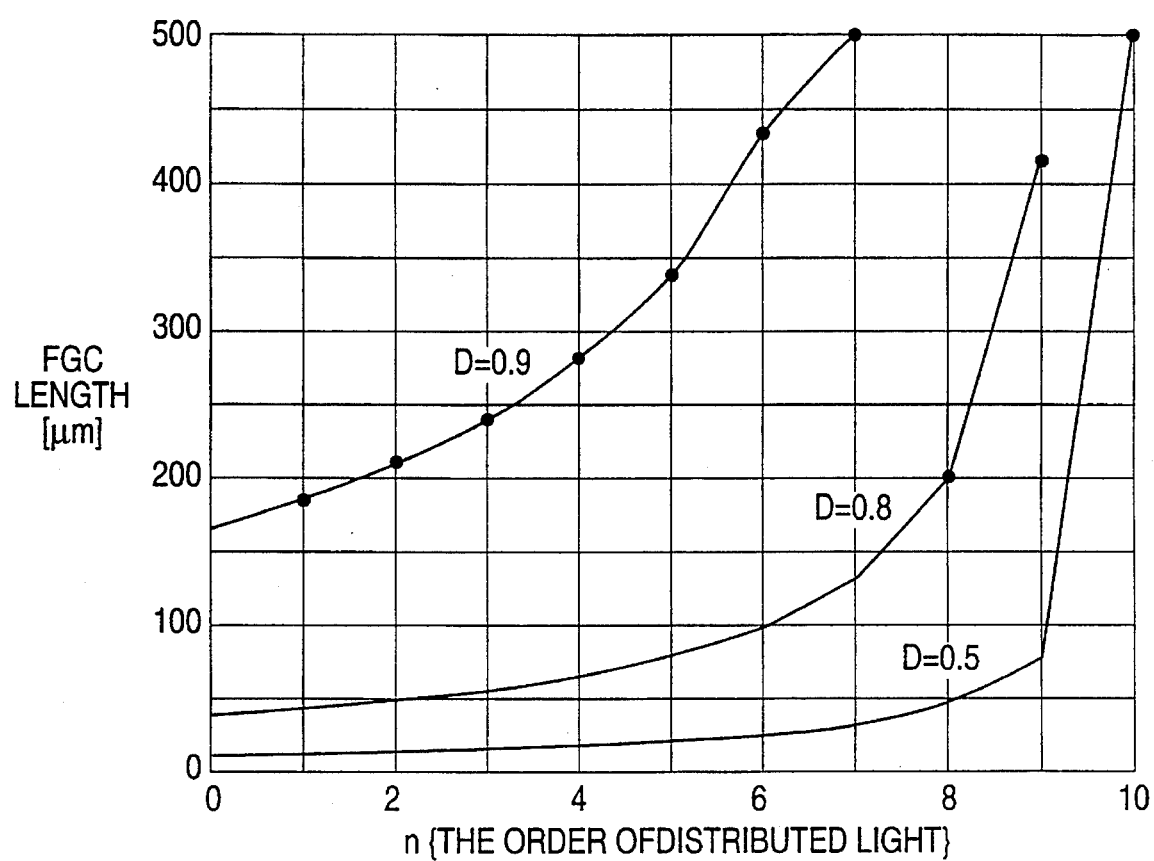
FIG. 7 is a graph indicating the length of one-dimensional FGCs and ratios that the length of the grating medium amounts to within one grating period of one focusing grating coupler of FIG. 4, in case of N=0.

Referring now to FIG. 7, in case of N=10 in one dimensional FGC arrays as shown in FIG. 4, three D values 0.5, 08, and 0.9 are used to reduce the distribution diameter of the optical signals distributed to the photodiodes to be below 10 μm, and each length of the FGCs is shown in FIG. 7.

From the first FGC's, each D value and length of the FGCs indicated by 10 dots, is given as D=0.9, L=180 μm, D=0.9, L=205 μm, D=0.9, L=245 μm, D=0.9, L=280 μm, D=0.9, L=345 μ m, D=0.9, L=440 μm, D=0.9, L=500 μm, D=0.8, L=200 μm, D=0.8, L=410 μ m, and D=0.5, L=500 μm.

The total OCE of 10 FGCs amounts to 99.1%, and the uniformity level of the distributed light amount is below 10%. When the inventive module is applied to the back-board interconnection scheme to couple communication signals with ultra-high speed performance among a plurality of opto-electronic integrated circuit boards in the high speed data communication network or high speed computer systems, optical signals transmitted through data bus lines at an ultra-high speed of more than several gigabits per sec. may be distributed to a plurality of OEIC boards. Moreover, the optical data transmission system has slight noise generating effect among adjacent transmission signals compared to electrical data transmission system, and the number of data transmission lines that may be integrated per unit area may be increased.

Although only a preferred embodiment and select modification of the invention have been disclosed and described, it is apparent that other embodiments and modifications of the invention are possible within the scope of the appended claims.

What is claimed is:

1. A back-board optical signal interconnection device comprising:

a glass substrate, a body of a back-board interconnection module;

input fiber arrays for connecting input signals to said glass substrate of the back-board interconnection module;

photodiodes connected between said glass substrate and boards to detect optical signals distributed from the back-board interconnection module in each board and outputting electrical signals to opto electronic integrated circuit boards;

focusing grating coupler arrays; and waveguides having said glass substrate on its upper surface and focusing grating couplers on its bottom to transmitting signals input through input fiber arrays to the glass substrate and distribute signals in focusing grating coupler arrays;

said focusing grating coupler arrays disposed on the bottom of the waveguides to distribute optical signals transmitted through said waveguides to each board.

2. The device according to claim 1, wherein said waveguides includes:

wave-guide lenses that are formed near the input fiber arrays to horizontally move the light that is incident from optical fibers within the waveguides; and an absorption layer disposed at the end portion of said waveguides to absorb and remove the remaining light in the waveguides.

3. The device according to claim 1, wherein said focusing grating coupler arrays may have a plurality of ratios that the length of grating medium amounts to within one grating period of one focusing grating coupler.

4. The device according to claim 3, wherein said ratios D that the length of grating medium amounts to within one grating period of one focusing grating coupler and the length L of the focusing grating couplers indicated by 10 dots, are given as D=0.9, L=180 μm, D=0.9, L=205 μm, D=0.9, L=245 μm, D=0.9, L=280 μ m, D=0.9, L=345 μm, D=0.9, L=440 μm, D=0.9, L=500 μm, D=0.8, L=200 μ m, D=0.8, L=410 μm, and D=0.5, L=500 μm, from the first focusing grating coupler's.

* * * * *